United States Patent [19]

Bradt

[11] Patent Number: 5,033,446
[45] Date of Patent: Jul. 23, 1991

[54] SCENT PROJECTILE MISSILE AND LAUNCHER

[76] Inventor: Richard A. Bradt, 500 Pletcher Rd., Lewiston, N.Y. 14092

[21] Appl. No.: 341,482

[22] Filed: Apr. 21, 1989

[51] Int. Cl.$^5$ .............................................. F41B 7/00
[52] U.S. Cl. ........................................ 124/26; 124/21; 124/37; 273/418
[58] Field of Search ................. 124/26, 21, 22, 37, 124/27; 273/418, 419, 416; 43/2, 6

[56] References Cited

U.S. PATENT DOCUMENTS

| | | | |
|---|---|---|---|
| 1,291,113 | 1/1919 | Pewther | 124/27 |
| 1,311,950 | 8/1919 | Cooper | 124/26 |
| 2,563,969 | 8/1951 | Skinner | 124/26 |
| 2,759,294 | 8/1956 | Tigrett | 124/37 X |
| 2,939,449 | 6/1960 | Kortick | 124/37 X |
| 3,191,342 | 6/1965 | Chalmers | 124/26 X |
| 3,365,834 | 1/1968 | Kreft | 124/26 X |
| 3,949,518 | 4/1976 | Lenza | 124/21 X |
| 4,541,402 | 9/1985 | Winters | 124/27 |
| 4,726,584 | 2/1988 | Bishop | 273/418 |
| 4,729,320 | 3/1988 | Whitlen, III | 273/418 X |

*Primary Examiner*—Peter M. Cuomo
*Attorney, Agent, or Firm*—Wallace F. Neyerlin

[57] ABSTRACT

This invention relates to a device and method for better enabling outdoors-people to see more wild animals up more closely by helping to cover up or mask their human scent at a greater distance. In the method of the present invention the outdoorsman arrives at his or her desired location and then proceeds to launch scent missiles (loaded with desired scent) in different directions, using the launcher. Typically four such scent missiles will be launched in directions approximately ninety degrees from each other. This surrounds the outdoorsman with natural woodsy odors thereby covering up or masking his/her own human odors.

8 Claims, 1 Drawing Sheet ated 5,033,446

SCENT PROJECTILE MISSILE AND LAUNCHER

FIELD OF THE INVENTION

This invention relates to a means and method for better enabling outdoorspeople to see more wild animals up more closely by helping to cover up or mask their human scent at a greater distance.

BACKGROUND OF THE INVENTION

One of the major problems facing a watcher, photographer or hunter of wild animals is the difficulty of getting or being close to same without being detected. The present invention addresses this problem and provides a means and method for better enabling the outdoorsperson to get closer to the wild animals.

A novelty search on the idea of the present invention was carried out. Specifically the search was directed to the use of a scent or aroma being deployed to mask the odors of humans from the animals, so the human can not be detected by the animal.

The following patents were found:

| Patentee | Patent Number | Title | Date |
| --- | --- | --- | --- |
| Bilyeu | 3,046,192 | Scent for Attracting Wild Game and Method for its Use | 7/24/62 |
| Sakschek | 4,609,245 | Dispenser and Method for Dispensing Hunting Odors | 9/2/86 |
| Reeves | 4,682,715 | Detachable Shoe-Lure Dispenser | 7/28/87 |
| Grinarmi | 4,735,010 | Scent Dispenser for Attachment Under a Shoe | 4/5/88 |

The Bilyeu patent, column 1, lines 66-7, states that a composition can mask the man-scent, but all claims relate to lure animals.

The Sakschek patent also states, column 1, lines 16 et seq., that some odors are used to mask the smell of a human, but the claims relate to the dispensing of the lure fluid through the device.

The reeves and Grinarmi patents both relate to devices attached to the shoes to spread lure to attract animals.

In any event, none of the patents found in the search teach or suggest the novel means and method as taught by the present invention for better enabling outdoorspeople to see more wild animals up more closely by helping to cover up or mask their human scent at a greater distance.

SUMMARY OF THE INVENTION

In the method of the present invention the outdoorsman arrives at his or her desired location and then proceeds to launch scent missiles (loaded with desired scent) in different directions using the launcher. Typically four such scent missiles will be launched in directions approximately ninety degrees from each other. This surrounds the outdoorsman with natural woodsy odors thereby covering up or masking his/her own human odors.

DETAILED DESCRIPTION OF THE DRAWINGS

Figure 1:
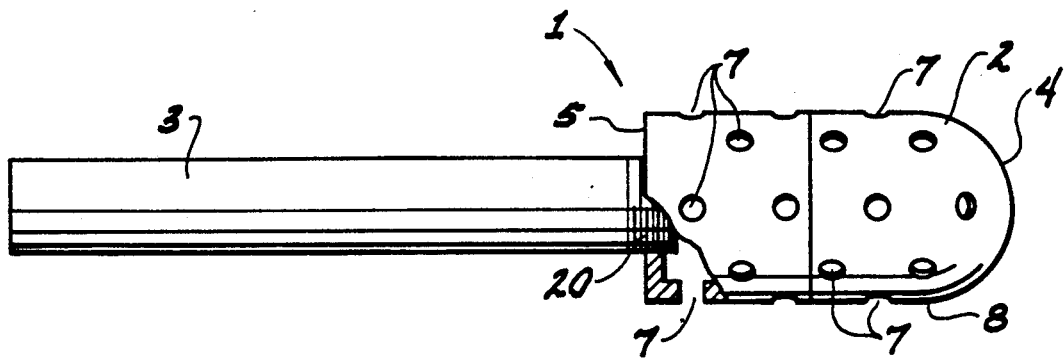
FIG. 1 is a horizontal perspective view of a scent missile as can be employed in carrying out the present invention.

Referring now in more detail to FIG. 1, the missile 1 is comprised of head 2 and shaft 3. Typically the head will be cylindrical in shape with a convex shaped outer end or tip 4 and will have a diameter of about 1 inch and a length from its tip 4 to its opposite end 5 of about 2 inches. Shaft 3 will typically have a diameter from about ⅛ to about ½ the diameter of the head and a length of about 4 to 5 inches. The missile will typically be made from an all-weather resistant, unbreakable, fluorescent orange plastic material.

Figure 2:
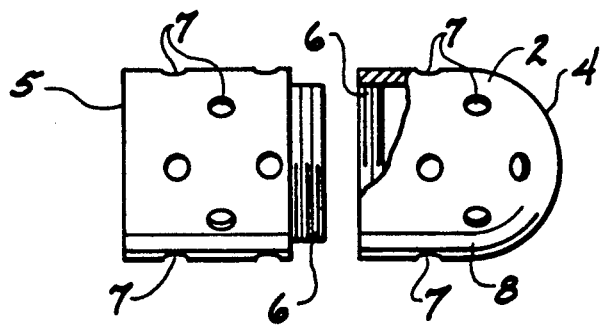
FIG. 2 is a horizontal perspective view of the head of the scent missile-separated in half.

In a preferred embodiment, as illustrated in FIG. 2, head 2 will possess threads 6, externally and internally near the center of the head to facilitate the taking apart of an servicing of the head with desired scent; and will also possess a multiplicity of vent holes 7 through surface 8 through which the scent composition placed within said head is capable of evaporating, thereby emitting such scent. (Preferably from about 20 to about 30 holes). Typically such scent composition within the head will be in liquid form impregnated upon a fabric packing material placed within said head. In such an embodiment the end of shaft 3 connected to the end 5 of the head could be integral therewith and of molded, one-piece construction where the shaft and head meet.

Alternatively, and/or in conjunction with the embodiment described above, and as illustrated in FIG. 1, the head can be so designed as to have an internal thread therein for a short distance from its end 5 to be threaded upon external thread 20 on shaft 3 at its end connected to the head.

Typically, the scent liquid employed will be capable of substantially fully evaporating within a period of about one hour to about three hours after landing in the position to where it has been launched; it being appreciated that the evaporation can proceed at an uneven rate and that a substantial amount of same can occur, for example, within the first 15 to 30 minutes or so.

Figure 3:
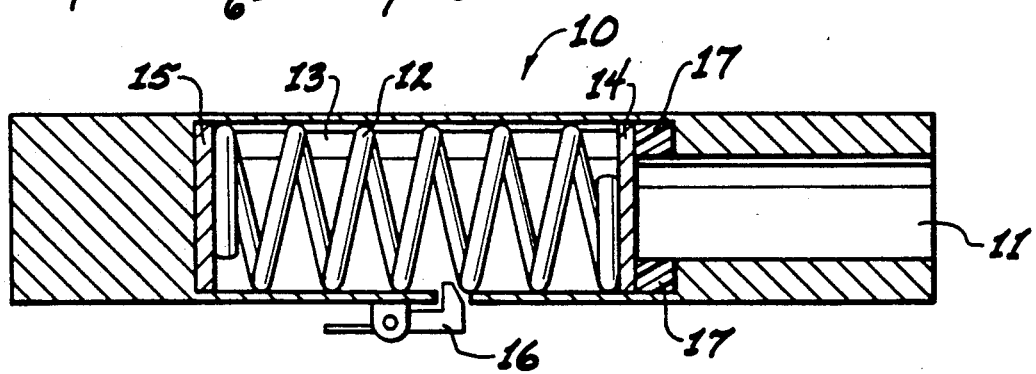
FIG. 3 is a cut out side view of a launcher that can be used to launch the scent missile of FIG. 1.

Referring now in more detail to FIG. 3, the launcher is depicted generally by the numeral 10 and includes a cylindrical barrel 11 slightly larger in diameter than the shaft 3 of the missile; a compressable coil spring 12 contained within a mid-chamber 13 of the launcher; said mid-chamber having solid faces 14 and 15 at each end thereof and being changeable in its length as the shaft 3 of the missile 1 is forced against the contacting end 14 of the mid-chamber, so as to compress the spring to provide the potential force for launching the missile, when release mechanism 16 is activated to enable the spring to return to its non-compressed condition, thus launching the missle. The launcher may also possess a sound cushion 17 so as to deaden or silence the sound of the launching of the missile. Overall, when the missile is placed within the launcher and is in the "ready to fire" position, the combination has an appearance similar to a small flashlight with a blunt tip. As so designed, the potential force created by the compressing of the spring is capable of launching the missile a distance of from about 15 yards to about 30 yards.

SUMMARY OF PRODUCT USAGE, BENEFITS AND ADVANTAGES

As previously indicated, the present invention provides a means and method for better enabling outdoors people to see more wild animals up more closely, by helping to cover up or mask their human scent at greater distance. By launching the scent projectile missiles the distances indicated herein, a "scent shield" radius, diameter or circumference can be created at a greater distance than heretofore believed possible.

The missile-launcher combination is unique and appealing because it is very portable and allows the outdoorsman to mask his/her human scent without leaving his/her desired location.

The idea fulfills the need to mask human odor as well as attract game animals for viewing and hunting purposes.

The benefits the user receives is the ability to overcome and take advantage of a wild animal's keen sense of smell.

A problem that the idea solves is preventing or avoiding or reducing the early detection of a photographer's or a hunter's presence or whereabouts.

Wild animal watchers can use the idea as well as photographers and hunters.

Because the missile preferably possesses a fluorescent orange color, and is substantially all-weather resistant and substantially unbreakable, it is generally easy to find and retrieve by its user; and usable over and over, thus being very economical also for accomplishing its purpose.

Having thus described the invention, it should be apparent that numerous structural modifications and adaptations in the missile and/or in the launcher may be resorted to without departing from the scope and fair meaning of the instant application as described herein above and as claimed herein below.

What is claimed is:

1. A combination capable of masking human odor so as to facilitate the closer-up viewing and hunting of game animals, said combination consisting of:

a. a scent projectile missile;

b. a scent composition contained within same; and c. a launcher for the missile;

said scent projectile missile consisting of a solid cylindrical shaft having a flat surface at one end which is contacted and acted upon by the launcher and the other end of which is integrally attached to a larger diameter hollow head, said head having a convex shaped outer end and having threads which are formed externally and internally near its axial center so as to facilitate its being taken apart and serviced with the scent composition, and said head having a multiplicity of vent holes through its outer cylindrical surface;

said scent composition being one that is capable of masking the man-scent;

and said missile launcher, consisting of a cylindrical barrel slightly larger in diameter than the shaft of the missile, a release mechanism, and a compressible coil spring contained within a mid-chamber of the launcher, said mid-chamber having solid faces at each end thereof and being changeable in its length as the contacting end of the shaft of the missile is forced against a solid face of the mid-chamber, so as to compress the spring to provide the potential force for launching the missile when the release mechanism is activated, to enable the spring to return to its non-compressed condition.

2. A combination according to claim 1 wherein the diameter of the shaft of the missile is about ½ inches and its length is about 3 inches, wherein the diameter of the missile head is about 1 inch and its length is about 2 inches, wherein the length of the barrel of the launcher is about 1½ inches, wherein the diameter of the launcher is about 1 inch, wherein the length of the barrel's mid-chamber is about 2 inches when the spring is non-compressed and wherein the length of the launcher is about 5 inches.

3. a combination according to claim 1 wherein said missile head contains from about 20 to about 30 vent holes.

4. A combination according to claim 1 wherein the potential force created by the compressing of the spring is capable of launching the missile a distance of from about 15 yards to about 30 yards.

5. A combination according to claim 1 wherein the scent composition is in liquid form impregnated upon a fabric packing material placed within said head and wherein the liquid is capable of evaporating through the said vent holes.

6. A combination according to claim 5 wherein the liquid is capable of evaporating within a period of from about 1 hour to about 3 hours.

7. A combination according to claim 1 wherein the missile is made from plastic, possesses a fluorescent orange color, and is substantially all-weather resistant and substantially unbreakable.

8. A combination according to claim 1 wherein the launcher possesses a sound cushion near the missile contacting end of the mid-chamber so as to deaden or silence the sound of the launching of the missile when the release mechanism is activated.

* * * * *